Patented Oct. 12, 1926.

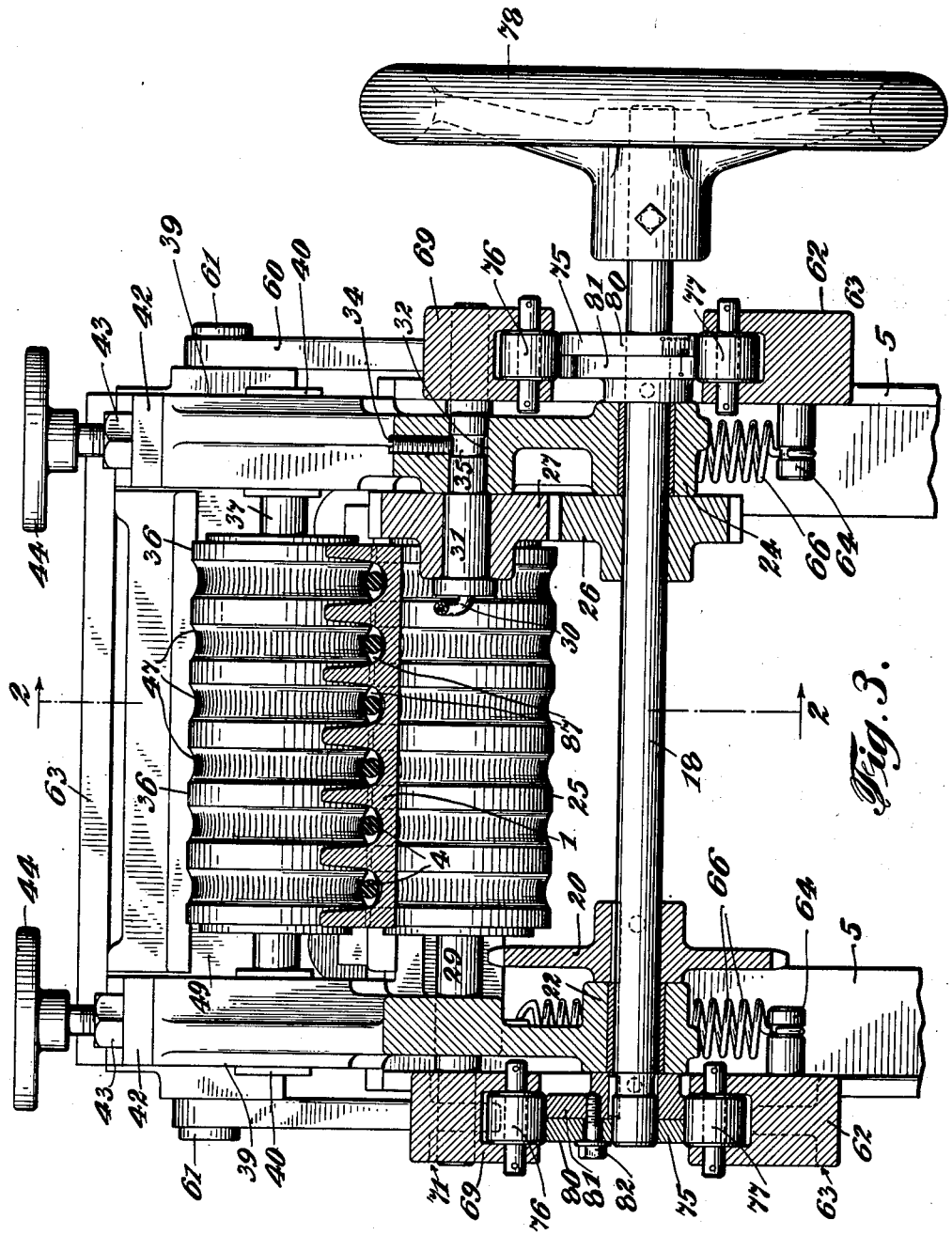

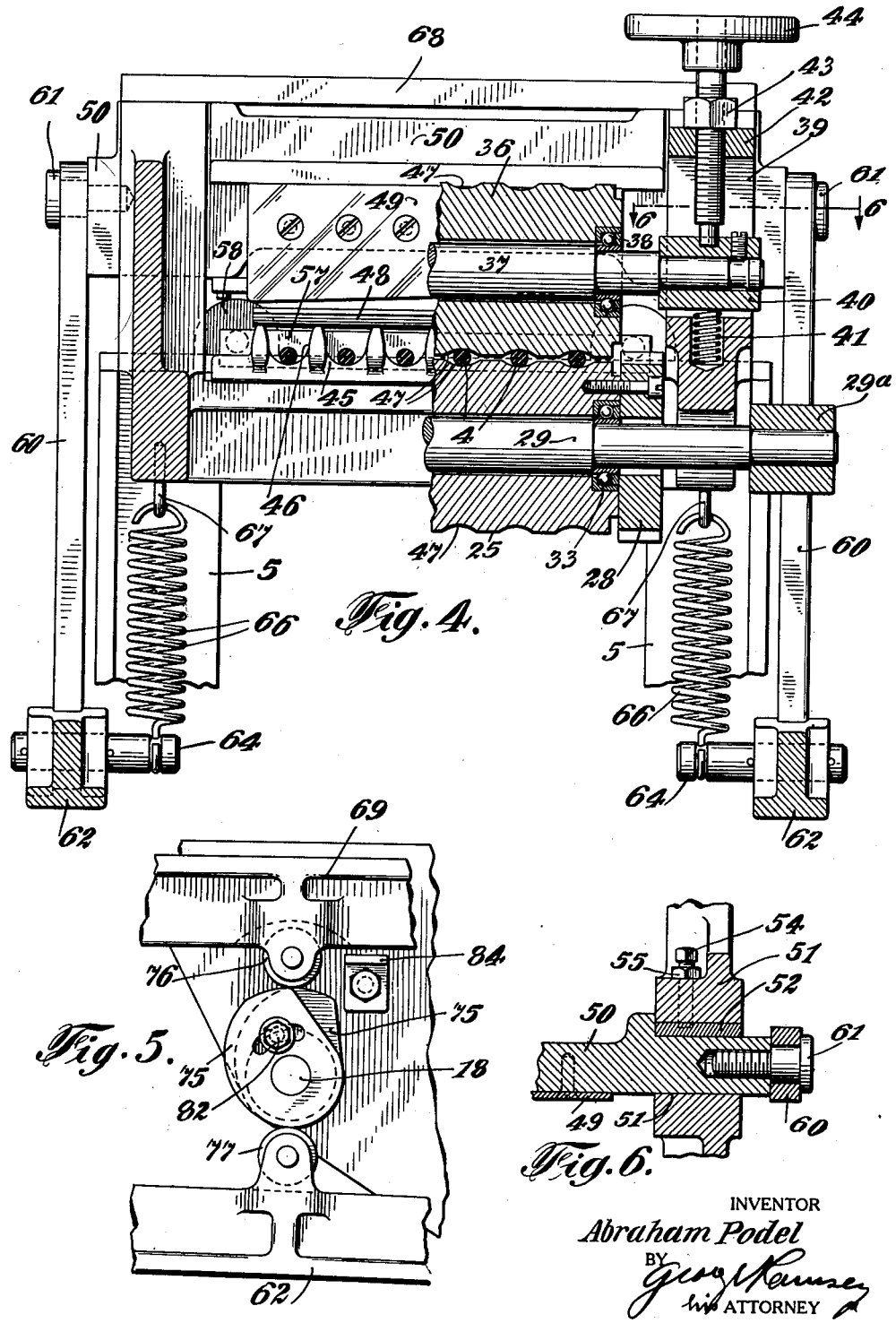

1,602,588

UNITED STATES PATENT OFFICE.

ABRAHAM PODEL, OF LONG ISLAND CITY, NEW YORK, ASSIGNOR TO ANCHOR CAP AND CLOSURE CORPORATION, OF LONG ISLAND CITY, NEW YORK, A CORPORATION OF NEW YORK.

RUBBER-STOPPLE-CUTTING MACHINE.

Application filed October 16, 1924. Serial No. 743,871.

The present invention relates to cutting machines and more particularly to a machine for cutting rubber stopples and the like.

An object of the present invention is to provide a machine adapted to receive and support a number of strips of unvulcanized rubber from which stopples are to be cut, to position accurately the various strips simultaneously, and subsequently sever portions of desired length from the ends of the various strips.

An object is to provide a pair of channel rollers adapted to engage the strips to be cut to position them intermittently for the cutting operation; to provide means for changing the periods during which the rollers are in engagement with the strips to vary thereby the lengths of the cut-off portions; and to further provide a stop to engage the ends of the strips to accurately determine their position with respect to a knife at the time of the cutting operation.

A further object is the provision of a driven shaft suitably geared to one of a pair of channel rollers to rotate same for feeding strips of unvulcanized rubber; the provision of a cam on the driven shaft adapted to move said channel rollers into engagement with each other to position the strips for the cutting operation, said cam engaging and operating a cutting knife, after its operation of the channel rollers, to cut stopples from the ends of the rubber strips.

Another object of the present invention is to provide a machine having a pair of brackets mounted one above the other and carrying a roller and a cutting knife respectively, with a driven shaft mounted between said brackets suitably geared to the roller and having cams mounted thereon adapted to engage the brackets consecutively to first move the roller, without effecting the intermeshing gears connecting it with the driven shaft, into engagement with the rubber strips to position same; thereafter permitting the roller to return to its initial position and subsequently engaging the other bracket to operate the cutting knife; to provide such a machine with means for quickly changing the curvature of the cam surface to determine roughly the length of the cut-off portions; and to provide further a stop for accurately determining the length of these portions.

A still further object is to provide a cutting machine having a channelled platform adapted to receive and guide rubber strips into cooperating channels in a pair of rollers adjacent the platform whereby the strips are fed into other aligned channels on a second platform, adjacent the cutting knife, and held firmly in position for the cutting operation.

A still further object is to provide a machine having the above characteristics which is simple and inexpensive in construction and easy to manufacture and one applicable to various sizes of rubber strips and readily adjustable to be equally useful in the manufacture of various types of rubber stopples.

Other and further objects of the present invention will be obvious upon an understanding of the illustrated embodiment, about to be described, or will be obvious from the accompanying drawings or indicated in the appended claims; and various advantages secured by the invention other than those herein specifically referred to will occur to one skilled in the art or become evident upon the employment of the invention in practice.

A preferred embodiment of the invention has been selected for the purposes of illustration and description and is shown in the drawings wherein;

Fig. 3 is a cross-sectional view along the line 3—3 of Fig. 2;

Fig. 4 is a cross-sectional view along the line 4—4 of Fig. 2 with certain parts broken away to show the knife and its associated mechanism in elevation;

Fig. 5 is a detailed view of the cam mechanism;

Fig. 6 is a detailed cross-section on line 6—6 of Fig. 4, showing certain features of the cutting mechanism.

Figure 1:
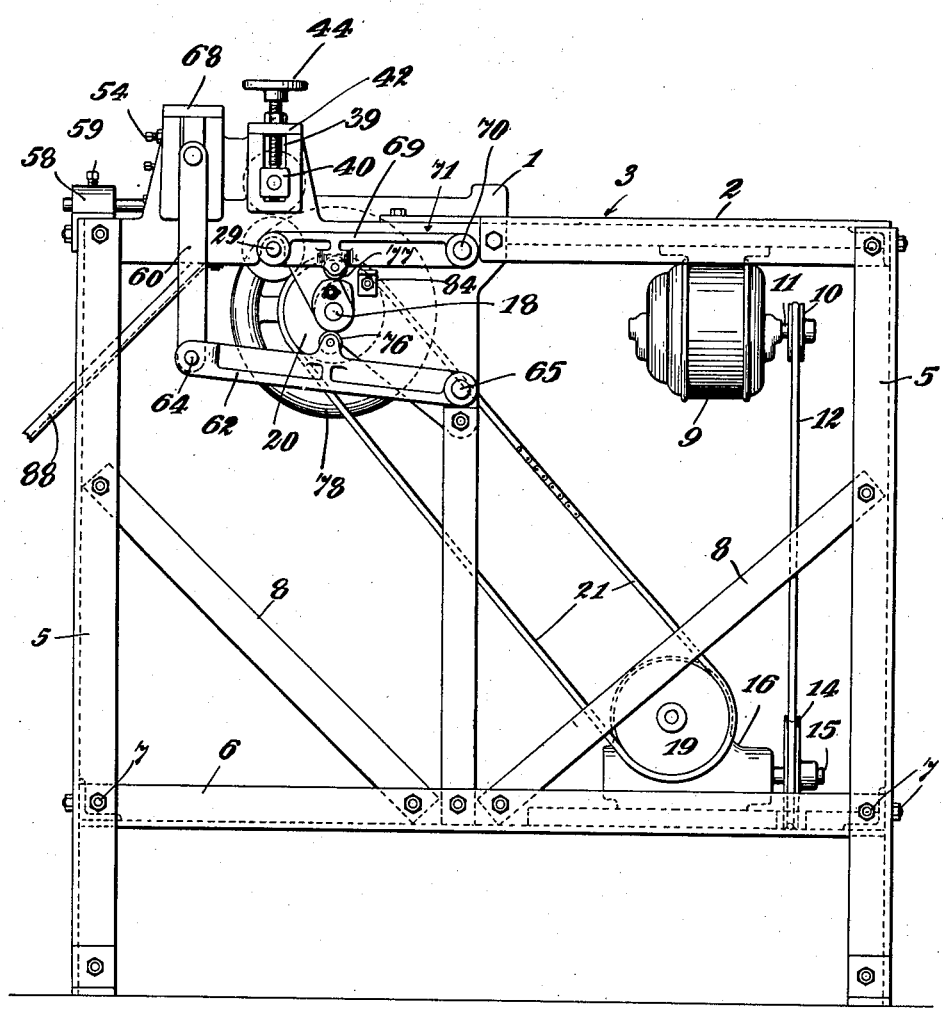
Fig. 1 is a side elevational view of the machine assembled.
Figure 2:
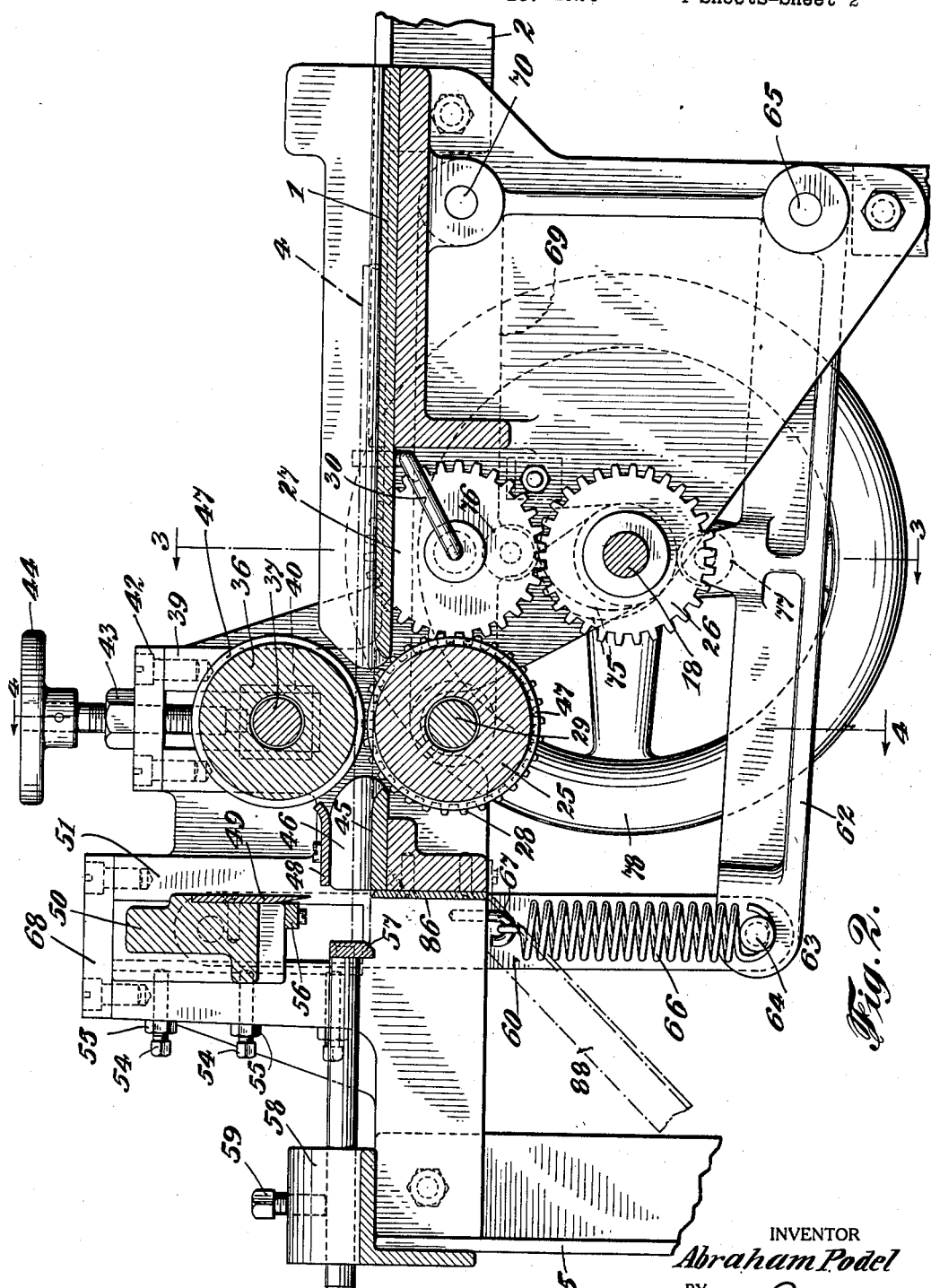
Fig. 2 is a cross-sectional view along the line 2—2 of Fig. 3.

Unvulcanized rubber is formed usually by mixing chemicals with raw rubber and heating and working the mixture until it becomes a homogeneous mass of plastic material somewhat similar to putty in its plastic state. The ordinary commercial articles sold so extensively are made by shaping this rubber into the desired form and then subjecting it to heat until it becomes semi-rigid and elastic or what is generally termed vulcanized. In the manufacture of rubber stopples and the like, the unvulcanized rubber is pressed into molds of suitable sizes which are heated until the rubber is vulcanized therein and the stopples formed.

Heretofore it has been customary in the manufacture of rubber stopples to form the unvulcanized rubber into long cylindrical strips and to cut these strips by hand into portions of sufficient length to fill the molds in which the stopples are vulcanized. The accuracy in the size of the cut depended entirely upon the skill of the operator and in any case, varied widely causing many defective stopples due to undersize cuts and considerable waste of material due to oversize cuts. Machines have been attempted heretofore to eliminate hand operation and the resulting disadvantages thereof, but they have been unsuccessful due partly to the plasticity of the unvulcanized rubber, their inability to accurately and speedily cut the strips, and the tendency of the unvulcanized rubber to adhere to the parts of the machine which come in contact with it. These objections, together with the initial high cost of construction have rendered prior machines not commercially feasible.

The present invention overcomes the difficulties of the prior art by providing a machine having a platform with a number of channels formed therein to receive cylindrical strips of unvulcanized rubber and guide them between a pair of channel rollers which feed them to a cutting mechanism. A second platform located between the rollers and the cutting mechanism, likewise provided with channelled supports, holds the strips in position for the cutting operation. A pair of brackets mounted on the framework are operatively connected to one of the rollers and the cutting mechanism respectively. A pair of cams on a shaft extending between these brackets is adapted to engage consecutively the bracket supporting the roller and the bracket operating the knife first to cause the roller to engage and position the respective strips and then to operate the cutting mechanism to sever the various strips simultaneously. A suitable stop is provided to determine accurately the length of the severed portions. Such a machine is automatic in all of its features, requiring only the feeding of the long strips of rubber to the channelled platform. The several strips of rubber are maintained in their respective paths separate from each other so that there is no danger of one strip sticking to another. At the same time, the positive engagement of the knurled rollers with the rubber strips never fails to position them properly in coordination with the operation of the cutting mechanism.

Referring to the drawings there is shown a channelled platform 1 bolted to a platform extension 2 to form a supporting table 3 for the unvulcanized rubber strips 4. The table 3 is mounted on legs 5 formed of V shaped channel members, and braced transversely by suitable V shaped channel members 6, attached thereto at their respective ends by bolts 7. The legs 5 are further reenforced by diagonal braces 8 bolted to the table legs and the transverse members respectively.

An electric motor 9 is attached to the under side of the platform extension 2 and connected to a reduction gear 16 by means of a pulley 10, on the motor shaft 11, belt 12, and pulley 14 on shaft 15 of the reduction gear. The reduction gear is, in turn, connected to drive shaft 18 through sprockets 19 and 20 and chain 21. Shaft 18 is mounted in suitable bearings 22 and 24 in the framework of the machine and is geared to the roller 25 by means of a gear 26 on shaft 18 meshing with an idling gear 27 which in turn meshes with a gear 28 rigidly attached to roller 25. Both the gear 28 and roller 25 are rotatably mounted, through the ball bearings 33, on shaft 29 supported in suitable bearings 29ª in the framework of the machine. An oil duct 30 extends through shaft 31 upon which the idling gear 27 is mounted to lubricate a bearing 32 in the framework which accommodates the shaft 31. A screw 34 engages the annular channel 35 of the shaft to retain it rotatably in position.

A second roller 36 is mounted above the roller 25 on a shaft 37 supported in bearings 40. Suitable ball bearings 38 at the respective ends of the second roller permit it to rotate freely relative to the shaft 37. A pair of vertical guideways 39 accommodates bearings 40 in which the shaft 37 is mounted. These bearings are resiliently held in their upper position by means of the springs 41. The upper part of the slots forming the guideways 39 are bridged by a pair of members 42 bolted thereto and suitable adjusting screws 44 are threaded into these bridge members to engage the bearings 40 and lower the second roller in opposition to the springs 41 to its desired lower position. Suitable lock nuts 43 maintain the adjusting screws 44 in their adjusted position.

Adjacent the rollers 25 and 36 is a second platform 5 having channels 46 corresponding to the channels in the platform 1 and to the cooperating knurled channels 47 in the rollers 25 and 36. A cover 48 is bolted to and fits over the channels 46 to prevent the rubber strips from being raised therefrom on the upward movement of knife 49.

The cutting knife 49 is inclined slightly to the horizontal and bolted to a back plate 50 which is adapted to slide in the guideways 51 to permit a vertical cutting movement thereof. The respective ends of the back plate are machined to fit in the guideways which are provided at one side with a wear plate 52 so that any wear occasioned by the friction between the back plate and the guideways will be on the wear plate which may be readily replaced at a low cost. The wear plate 52 is retained in position by means of the screws 54 having lock nuts 55. A knock-off bar 56 is bolted to the lower portion of the back plate adjacent the cutting edge of a knife to prevent the severed portions of unvulcanized rubber from adhering to the back of the knife. A stop 57 is mounted in bearings 58 on the frame of the machine and retained in adjustable position by means of set screws 59 determine accurately the position of the strips of rubber at the time of the cutting operation.

A pair of arms 60 are secured to the respective ends of the back plate 50 by means of bolts 61 (see Fig. 6) and are attached at their lower ends to a pair of horizontal arms 62 by means of bolts 64 and pivoted to the framework at 65 to form a bracket 63. Springs 66 attached to anchors 67 at their upper ends and engaging the bolts 64 at their lower end retain the vertical arms 60 and the knife 49 in the uppermost position as determined by the bridge plate 68 bolted over the guideways in which the knife slides.

A second pair of horizontal arms 69 are pivoted on the frame work at 70 to form a bracket 71 adapted to receive at its free end the shaft 29, upon which the roller 25 is mounted. The position of the pivot 70 is such that the bracket 71 may be moved to raise or lower the roller 25 without disturbing the mesh of gears 27 and 28. In other words, the length of the arms is sufficiently great to permit a limited movement of the roller 25 and its attached gear in a vertical direction without disturbing in any way the driving of the roller 25 by the drive shaft 18. Thus, both the roller 25 and the knife 49 are movable vertically by means of the brackets formed by the horizontal arms 62 and 69.

A pair of cams 75 are mounted on the respective ends of shaft 18 to fit between the cam followers 76 and 77 on the respective brackets 63 and 71. As the shaft 18 is rotated through sprocket 20 or the hand wheel 78, the cams 75 engage the followers 76 and raise the upper bracket 71 which moves the roller 25 into engagement with the strips of rubber. Since the drive shaft 18 and likewise the roller 25 rotate continuously, and since the upper roller rotates freely on its shaft, the strips are moved a distance dependent upon the time that the roller 25 is in engagement therewith. This period is determined by means of the relative adjustment of the two parts 80 and 81 of the cams 75 through the set screw 82.

Referring to Fig. 5, it will be readily seen that by loosening the set screw 82, the two parts of the cams 75 may be moved relative to each other to change the curvature of the cams so that the period during which the cams are effective is increased or decreased. Immediately after the cams 75 become effective to raise or lower roller 25 and position the strips, they permit the bracket 7' and roller 25 to fall to their lower position as determined by the stop 84, bolted to the frame, and thereafter engage the cam followers 77 on the lower bracket to pull the knife 48 downwardly until it passes a cooperating cutting edge 86 bolted to the frame and severs the strips of rubber.

In the operation of the machine a number of cylindrical strips of unvulcanized rubber preferably 6 are placed in the channels 87 of the platform 1 and are pushed forward manually until they contact with the channel rollers. Since these rollers move toward and away from each other intermittently, it is apparent that it is quite easy to advance the strips sufficiently far to be engaged by the rollers irrespective of their position. Roller 25 is rotated constantly through gears 28, 27, 26, shaft 18, sprocket 20, chain 21, and reduction gear 16 by the electric motor 9. The cams 75 on the shaft 18 raise and lower the roller 25 intermittently into and out of engagement with the rubber strips to position them for the cutting operation. Absolute accuracy in the length of the severed portion is obtained by the adjustable stop 57 which engages the ends of the strips and limits their forward movement. Immediately after the roller 25 is moved upwardly to position the strips, the cams 75 engage the followers 77 to move the lower bracket downwardly to operate the cutting mechanism, and the severed portions drop into the chute 88 and are conveyed to any convenient point.

It will be noted that there is provided in this invention a machine of simple and inexpensive construction and highly efficient action, which is adapted to cut a number of articles simultaneously with a minimum of normal labor and attention, thereby greatly reducing the cost of manufacture of rubber stopples and the like.

As various embodiments may be made in the invention above set forth, and as many changes may be made in the structure, and since it may be adapted for various uses other than those set forth in the specification hereinbefore, it is to be understood that all matter is to be interpreted as illustrative and not in a limiting sense. The scope of the invention is defined in the following claims.

Having thus described my invention, what I claim is:—

1. In a machine of the class described, the combination of a suitable framework, a roller mounted on said framework, a pair of springs adapted to retain said roller in its normal position, a second roller movable relative to said first roller, and driving means for rotating said second roller continuously, and a pair of cams adapted to force said second roller into engagement with the first to engage and advance an article to be cut.

2. In a machine of the class described, the combination of a suitable framework, a roller mounted on said framework having a plurality of annular channels adapted to receive a plurality of strips of unvulcanized rubber, driving means for rotating said roller, and a pair of cams for moving said roller into engagement with said strips to advance them to cutting position.

3. In a machine of the class described, the combination of a framework, a roller mounted on said framework having a plurality of annular channels adapted to receive articles to be cut, driving means for rotating said roller, cam operated devices for moving said roller relatively to the platform and into engagement with said articles to advance them to cutting position, and a platform having channels adapted to guide said articles into said annular channels.

4. In a machine of the class described, the combination of a framework, a pair of rotatable arms on said framework, a roller mounted on said arms, driving means for rotating said roller continuously, a two part cam to engage said arms and move said roller into engagement with an article to advance said article to cutting position, and means to adjust said came to determine the period of engagement of said roller with said article.

5. In a machine of the class described the combination of a suitable framework, a pair of arms on said framework, a roller mounted on said arms, a second roller mounted above said first roller and adapted to cooperate therewith, said rollers having annular channels therein, cams adapted to engage said arms and move said first roller upwardly to engage articles between the channels in said rollers to advance them to cutting position, and driving means for said first roller.

6. In a machine of the class described, the combination of a roller, a gear rigidly connected to said roller, a second gear adapted to mesh with said first mentioned gear to drive said roller, and means for rotating said roller about an axis parallel to said roller, and determined relative to the center of pitch of the intermeshing gear teeth, to bring said roller into engagement with articles to be positioned without disturbing the mesh of said gears.

7. In a machine of the class described, the combination of a roller having a gear at the end thereof, a second gear adapted to mesh with said gear to drive said roller, and means for moving said roller into engagement with articles to be positioned without disturbing the meshing of said gears.

8. In a machine of the class described, the combination of a roller having a gear at the end thereof, a second gear adapted to mesh with said first mentioned gear to drive said roller, means for moving said roller into engagement with articles to be positioned without disturbing the meshing of said gears, and means to limit the movement of said roller away from said articles.

9. In a machine of the class described, the combination of a suitable framework, a roller mounted on said framework, a gear rigidly connected to said roller, a shaft, means for driving said shaft, a gear on said shaft, an idling gear meshing with said other gears, and means for swinging said roller about said idling gear into engagement with the articles to be moved without disturbing the intermeshing of said gears.

10. In a machine of the class described, the combination of a suitable framework, a roller mounted on said framework, a gear rigidly connected to said roller, a shaft having a gear thereon, means for driving said shaft, and means for swinging said roller into engagement with the articles to be moved while said roller is being driven without disturbing its relation to the other gear.

11. In a machine of the class described, the combination of a pair of rollers for positioning simultaneously a plurality of articles to be cut, supports for said articles, cutting devices adjacent said rollers, and a pair of cams for bringing the lower of said rollers into engagement with articles to position same and subsequently to operate said cutting devices to sever the articles.

12. In a machine of the class described, the combination of a pair of rollers for positioning articles to be cut, supports for said articles, cutting devices adjacent said rollers, a two part cam for the lower of said rollers into engagement with articles to position same and subsequently to operate said cutting devices to sever the articles, and means to adjust the parts of said cam to determine the amount said articles are moved forward.

13. In a machine of the class described, the combination of a pair of rollers for positioning articles to be cut, supports for said articles, cutting devices adjacent said rollers, a two part cam effecting to bring said rollers into engagement with said articles, means for adjusting said cam parts relative to each other to determine the position of said articles, a stop cooperating with said cam to control the position of said articles, and mechanism for operating said cutting devices.

14. In a machine of the class described, the combination of a pair of rollers having annular channels to receive elongated articles to be cut, channelled supports on each side of said rollers for the respective ends of said articles, a cutting knife adjacent one of said supports, a cam adapted to control the position of said rollers and to operate said knife, and driving means for rotating said rollers and said cam.

15. In a machine of the class described, the combination of a pair of rollers having annular channels to receive elongated articles to be cut, channelled supports on each side of said rollers for the respective ends of said articles, a cutting knife adjacent one of said supports, a cam adapted to control the position of said rollers and to operate said knife, driving means for rotating said rollers and said cam, and a stop for controlling the length of the portions cut from the articles.

16. In a machine of the class described the combination of a channelled roller retained in position, a cooperating channelled roller movable toward and away from said other roller, channelled supports for elongated articles on each side of said rollers, a pair of guideways, a cutting knife in said guideways adjacent one of said supports a pair of arms attached to said knife, a cam adapted to move said second roller into engagement with said first mentioned roller to feed the articles intermittently to said knife, and also adapted to engage said arms to actuate said knife.

17. In a machine of the class described, the combination of a channelled roller adjustably retained in position, a cooperating channelled roller movable toward and away from said other roller, channelled supports for elongated articles on each side of said rollers, a pair of guideways, a cutting knife in said guideways adjacent one of said supports, a pair of arms attached to said knife, a cam adapted to move said second roller into engagement with the first to feed the articles intermittently to said knife and also adapted to engage said arms to actuate said knife, and a stop for determining the position of said articles with reference to said knife prior to the cutting operation.

18. In a machine of the class described, the combination of a channelled roller, springs for retaining said roller in position, a cooperating channelled roller movable toward and away from said other roller, channelled supports for elongated articles on each side of said rollers, a pair of guideways, a cutting knife in said guideways, adjacent one of said supports, a pair of arms attached to said knife, a pair of springs for holding said arms in their upper position, and a cam adapted to move said second roller into engagement with the first to feed the articles intermittently to said knife and also adapted to engage said arms to actuate said knife.

19. In a machine of the class described, the combination of a suitable framework, a pair of vertical slots, bearings in said slots, a channelled roller mounted in said bearings, a pair of arms pivotally mounted on said framework, a second roller carried by said arms and positioned beneath said first roller, a shaft geared to said second roller, driving means for said shaft, a second pair of arms pivoted on said framework beneath said first pair of arms, a knife attached to said second pair of arms, and a pair of cams mounted on said shaft, between said pairs of arms adapted to engage said first pair of arms to raise said second roller into engagement with articles to be positioned and adapted to engage said second pair of arms to operate said knife.

20. In a machine of the class described, the combination of a suitable framework, a pair of vertical slots, bearings in said slots, a channelled roller mounted in said bearings, a pair of arms pivotally mounted on said framework, a second roller carried by said arms and positioned beneath said first roller, a shaft geared to said second roller, driving means for said shaft, channelled supports on each side of said rollers to guide articles between said rollers, a second pair of arms pivoted on said framework beneath said first pair of arms, a knife attached to said second pair of arms, a pair of cams mounted on said shaft between said pairs of arms adapted to engage said first pair of arms to raise said second roller into engagement with articles to be positioned and adapted to engage said second pair of arms to operate said knife, and a stop to limit the position of the articles to be severed.

21. In a machine of the class described, the combination of a suitable framework, a pair of vertical slots, bearings in said slots, a channelled roller mounted in said bearings, a pair of arms pivotally mounted on said framework, a second roller carried by said arms and positioned beneath said first roller, a shaft geared to said second roller, driving means for said shaft, a second pair of arms pivoted on said framework beneath said first pair of arms, a knife attached to said second pair of arms, a pair of two part cams mounted on said shaft between said pairs of arms adapted to engage said first pair of arms to raise said second roller into engagement with articles to be positioned and adapted to engage said second pair of arms to operate said knife, and means to adjust the relative positions of the parts of said cam to control the lengths of the severed portions of said articles.

22. In a machine of the class described, the combination of a pair of arms pivoted at one end to the framework of the machine, a roller mounted between the other ends of said arms, a second pair of arms pivotally mounted on the machine, cutting means attached to the free ends of said second pair of arms, and a pair of cams between said pairs of arms adapted to move said roller to position an article to be cut and subsequently to operate said cutting means to sever said article.

23. In a machine of the class described, the combination of a pair of arms pivoted at one end to the framework of the machine, a roller mounted at the other ends of said arms, a second pair of arms pivotally mounted to the machine, cutting means attached to the free ends of said second pair of arms, and a pair of cams between said pairs of arms adapted to move said roller to position simultaneously a plurality of strips of unvulcanized rubber to be cut and subsequently to operate said cutting means to sever said strips.

24. In a machine of the class described, the combination of a pair of arms pivoted at one end to the framework of the machine, a roller mounted at the other ends of said arms, a second pair of arms pivotally mounted to the machine below said other arms, cutting means attached to the free ends of said second pair of arms, and a pair of cams between said pairs of arms adapted to move said first pair of arms upwardly to position an article to be cut and subsequently to move said second pair of arms downwardly to operate said cutting means to sever said article.

25. In a machine of the class described, the combination of a pair of rollers mounted one above the other adapted to engage and position articles, said rollers having a plurality of annular channels adapted to accommodate a series of articles, a platform adjacent said rollers having channels therein adapted to guide articles into the channels of said rollers, means for adjusting the vertical position of the upper roller, devices for rotating said lower roller continuously, and mechanism for moving said driven roller into and out of engagement with the articles.

26. In a machine of the class described, the combination of a pair of rollers mounted one above the other and adapted to engage and position articles, a pair of arms pivoted at one end to the framework of the machine and adapted to support said lower roller, a shaft extending beneath said arms, a pair of cams on said shaft adapted to engage said arms and to move said lower roller into engagement with said articles to position same.

27. In a machine of the class described, the combination of a pair of rollers mounted one above the other and adapted to engage and position strips of rubber, a pair of arms pivoted at one end to the framework of the machine and adapted to support said lower roller, a shaft extending beneath said arms, a pair of cams on said shaft adapted to engage said arms and to move said lower roller into engagement with said strips to position same, and means for rotating said lower roller and said cams continuously.

28. In a machine of the class described, the combination of a framework, a roller mounted on said framework having a plurality of knurled annular channels adapted to receive the ends of rubber strips to be cut, driving means for rotating said roller, a second roller, devices for bringing said rollers into engagement with said strips to advance them simultaneously to cutting position, and a platform having channels adapted to guide said articles into said annular channels.

29. In a device of the class described, the combination of a channelled platform adapted to accommodate a plurality of elongated strips, a member extending transversely of said platform, a cam for bringing said member into engagement with said strips periodically to move said strips simultaneously to cutting position, and means for severing portions from the ends of said strips.

30. In a device of the class described, the combination of a channelled platform adapted to accommodate a plurality of strips of unvulcanized rubber, a member extending transversely of said platform and adapted to move in a curved path into and out of engagement with said strips, means for bringing said member into engagement with said strips periodically to move said strips simultaneously to cutting position, and means for severing portions from the ends of said strips.

ABRAHAM PODEL.